(12) United States Patent
Garrett et al.

(10) Patent No.: US 6,653,373 B2
(45) Date of Patent: Nov. 25, 2003

(54) METHOD FOR TREATING A SWIMMING POOL SURFACE

(75) Inventors: Gregory Garrett, Chandler, AZ (US); Vito Mariano, Shanty Bay (CA)

(73) Assignee: Applied Materials Technologies, Inc., Chandler, AZ (US)

( * ) Notice: Subject to any disclaimer, the term of this patent is extended or adjusted under 35 U.S.C. 154(b) by 110 days.

(21) Appl. No.: 09/966,623

(22) Filed: Sep. 28, 2001

(65) Prior Publication Data

US 2002/0035174 A1 Mar. 21, 2002

Related U.S. Application Data

(62) Division of application No. 09/122,584, filed on Jul. 24, 1998, now abandoned.

(51) Int. Cl.⁷ .................... C04B 7/13; C04B 24/26; B05D 1/00
(52) U.S. Cl. ............... 524/5; 427/393.6; 427/403
(58) Field of Search ............... 529/5; 427/403, 427/393.6

(56) References Cited

U.S. PATENT DOCUMENTS

| 4,494,990 A | 1/1985 | Harris |
| 4,793,861 A | 12/1988 | Sohm |
| 4,880,467 A | 11/1989 | Rirsch et al. |
| 4,975,396 A | 12/1990 | Thiery |
| 4,975,397 A | 12/1990 | Dworak et al. |
| 5,308,397 A | 5/1994 | Whatcott |
| 5,360,476 A | 11/1994 | Whatcott |
| 5,362,320 A | 11/1994 | Whatcott |
| 5,366,550 A | 11/1994 | Schad |
| 5,637,144 A * | 6/1997 | Whatcott et al. ........... 106/718 |
| 5,650,004 A | 7/1997 | Yon |
| 5,685,903 A | 11/1997 | Stav et al. |

FOREIGN PATENT DOCUMENTS

JP   100468   *  5/1987

OTHER PUBLICATIONS

F.M. Lea, The Chemistry of Cement and Concrete, 3d ed., Chemical Publishing Co., Chapt. 12 (1971).

* cited by examiner

*Primary Examiner*—Peter Szekely
(74) *Attorney, Agent, or Firm*—Sullivan Law Group

(57) ABSTRACT

The cementitious material comprises a cement having a cement mass, and an aggregate having an aggregate mass. The cement mass and the aggregate mass has a combined mass of about 80 to 95 percent of the total mass. The cementitious material also includes a pozzolan composition comprising at least one of a silica fume and a metakaolin. The pozzolan composition is present in an amount of about 4.0 to 6.0 percent of the total mass. The cementitious material further includes an acrylic polymer composition.

24 Claims, No Drawings

METHOD FOR TREATING A SWIMMING POOL SURFACE

RELATED APPLICATION

This is a divisional of application Ser. No. 09/122,584 filed on Jul. 24, 1998 now abandoned, the complete disclosure of which is incorporated herein by reference.

BACKGROUND OF THE INVENTION

1. Field of the Invention

The present invention relates to cementitious compositions and related methods. More specifically, it relates to cementitious compositions and admixtures which are resistant to aggressive environments such as aqueous chemical environments, as might be found in a swimming pool or spa.

2. Description of the Related Art

Cementitious compositions or materials as the terms are used herein are used in their commonly used but broad sense to include compositions, materials, products, etc. which include as a component cement. The term includes such things as concrete, shotcrete, plaster, stucco, and the like. Cementitious materials are used in a tremendous variety of applications. In recent years there has been increased commercial interest in cementitious products which have surface coloration. Examples would include cementitious sculptures, building exteriors such as walkways and concrete railings, swimming pools, and spas. It has generally been preferred in many applications that the colored particles or pigments be imbedded or blended into the cementitious material, rather than merely painted or otherwise placed on the surface of a cementitious product. In such applications, the quality of the colored particles placement, such as the uniformity of color, has been important. The use of pigments in such applications has been disadvantageous in that it is difficult to properly disperse the pigments, they make it more difficult to control the resulting texture, and they are subject to ultraviolet light degradation, fading, etc. The nature of the cementitious materials and known methods for pigmentation also have placed limits on the range of colors that may be created with cementitious products.

Cementitious materials commonly are exposed to aggressive fluids, such as water, aqueous solutions, fluids which include minerals, acids, alkaline fluids, etc. These fluids usually react with the components of the cementitious material to degrade its integrity. An example of such degradation would include circumstances where the aggressive fluid reacts with and/or dissolves soluble portions of the cementitious material and thereby removes the soluble or partially-soluble component or components from the cementitious matrix. This often results in weakening the cementitious material, marring or pitting of its surface, and detracting from its effectiveness in the given application.

The deterioration of cementitious products by aggressive fluids has been the subject of study and investigation for years. See, e.g., F. M. Lea, *The Chemistry of Cement and Concrete,* 3d Ed., Chemical Publishing Co., Inc., 1971. A number of different types of attacks by aggressive fluids on cementitious products have been identified in the literature. For example, N. P. Mailvaganam, *Repair and Protection of Concrete Structures,* CRC Press, 1992, identifies five classes of attacks, including Type I (simple leaching of calcium hydroxide), Type II (reactions between attacking solutions and cement compounds resulting in the formation of secondary compounds, which are either leached out or remain in an unbound form, resulting in gradual strength loss), Type III (reaction similar to Type II, but resulting in the crystallization of the reaction products giving rise to expansive forces which disrupt the concrete), Type IV (crystallization of salts directly from the attacking solution causing disruption of the concrete), and Type V (corrosion of the embedded steel reinforcement resulting from breakdown of the passivation zone by aggressive solutions).

Beginning in the mid-1960's, a phenomenon known as "spot etching" began to be discussed in various trade publications within the swimming pool industry. Spot etching has come to be known as the selective dissolution of calcium hydroxide from the cementitious components of plaster, also known as marcite, that is used to finish the pool. Swimming pool plaster typically is a relatively thin ($\frac{3}{8}$ inch to $\frac{3}{4}$ inch) layer of a cementitious matrix comprising a mixture of white cement and calcium carbonate aggregate such as limestone or marble. This type of plaster has been one of the most commonly applied concrete pool finishes used in the United States over the past 40 years. Spot etching of these plaster surfaces appears as small areas, usually rounded in nature, having a typical size about $\frac{1}{8}$ inch to $\frac{3}{4}$ inches, with increased porosity and permeability as compared to non-etched areas. This spot etching phenomenon has grown into one of the most significant concerns in the swimming pool industry as it relates to pool interior finishes.

The increased incidence of spot etching and other aggressive fluid deterioration phenomena are believed to be attributable to a number of factors. Prior to the 1960's, the primary sanitizers used by swimming pool and spa owners to kill microorganisms such as bacteria and algae were alkali chlorine compounds such as calcium hypochlorite (pH 11.7) and sodium hypochlorite (liquid chlorine, pH 13). These chlorine products are characterized by high pH's, and they usually contribute to increases in pH, calcium hardness, and/or total dissolved solids (TDS) levels of water in swimming pools. They often cause migration of the mineral or metallic ions out of solution, resulting in scaling or precipitation or both. These products typically were not used in conjunction with stabilizer or cyanuric acid, and they had to be added frequently to maintain a consistent chlorine residual as sunlight dissipated the chlorine in the water.

By the mid-1970's, acidic sanitizers such as trichloro-s-triazinenrine, and bromochlorodimethylhydantoin, were gaining popularity due to their long lasting nature and ease of use. These sanitizers, however, resulted in the decrease of total alkalinity and, if uncorrected, of water pH levels.

As the popularity of acidic sanitizers increased, a trend developed in the U.S. municipal water treatment industry toward softer water. This softer water, in which mineral and divalent metallic constituents were removed, improved the palatability of the potable water supply. But it had detrimental effects on cementitious products such as swimming pool plaster. By decreasing the concentration of these mineral components, particularly calcium carbonate and other calcium salts, the carbon dioxide-carbonate equilibrium was shifted such that greater dissolution of soluble calcium components of the cementitious products such as calcium hydroxide was promoted. See, e.g., F. M. Lea, *The Chemistry of Cement and Concrete,* 3d Ed., Chemical Publishing Co., 1971, Chapter 12. Spot etching and similar deterioration phenomena resulted. These effects also occurred or were enhanced by the increased presence of acid rain and other forms of air pollution, which have contributed to the aggressiveness of water and other aggressive fluids by increasing the acidity of the fluids.

Two primary approaches have been suggested for addressing etching of cementitious products by aggressive fluids—control of the chemistry of the fluid, such as swimming pool water balance, and (2) providing a chemically inert barrier between the cementitious product and the aggressive fluid. See, e.g., E. Dow Whitney, *A Study of Marcite (Plaster) Deterioration in Swimming Pools*, (1991), at page 50.

Control of fluid chemistry is not feasible in many cementitious product applications. Even in those applications for which such control is feasible, it requires greater attention and maintenance. For example, in the swimming pool context, swimming pool owners have had to more diligently monitor and adjust their pool water using chemical additives in an effort to maintain a proper chemical balance and avoid deleterious etching effects. Pool owners often lacked the knowledge of when and how to do the testing and make the adjustments to water chemistry, and they often lacked the ability or discipline to do so each time they were required.

The approach of providing a chemically inert barrier has been problematic as well. The application of separate sealers or coatings such as epoxies, polyurethanes, vinyls, polyesters, silicates, and various hydrophobic sealers and paints has been unattractive. The task of identifying and selecting specific sealers that have the appropriate characteristics for a given application often is difficult and time consuming. The additional cost of the sealers and coatings and the added labor of applying them also are significant limitations.

In certain applications of cementitious products, an approach of chemically forming an inert or impervious barrier has been used. For example, U.S. Pat. No. 5,588,990, issued to Dongell on Dec. 31, 1996, discloses a pozzolan cement composition and admixture which includes cement, calcined diatomaceous earth, calcined kaolin, and about 0.5% to about 6% (w/w) of potassium, with or without talc and/or bentonite or their functional equivalents. The literature in the construction industry also reports that silica fume (a pozzolan) has been used as an admixture with cement. See, e.g., T. A. Durning et al., "Using Microsilica to Increase Concrete's Resistance to Aggressive Chemicals," *Concrete Admixtures*, American Concrete Institute Compilation 22, at page 35. This approach has reportedly enjoyed some success. See, e.g., M. Lessard et al., "Long-Term Behavior of Silica Fume Concrete," *Mineral Admixtures*, American Concrete Institute Compilation 22, at page 15. The use of such pozzolans as silica fume has been somewhat limited or disadvantageous in many applications, however, in that in the past the pozzolan usually has been black or gray, and therefore has been unacceptable for applications in which white or lightly-colored cementitious products are desired.

The approach of using various polymer materials, typically superplasticizers such as melamine and naphthalene-based products, as admixtures also has been reported for use as a dispersing agent. This typically involves adding the polymer material as an admixture to improve the dispersion of ultra-fine particles in the cementitious product. These superplasticizers did not aid in bonding. Other polymers have been known to aid in the improvement of the chemical resistance of matrix through hydrophobic action or the ability to repel water. These approaches have had mixed success. Failures often are attributable to adverse effects of sunlight (photoreactivity), hydrolysis or chemical breakdown of the resultant cementitious product in the aggressive fluid environment, and temperature sensitivity. Their unpleasant odors also have created drawbacks.

OBJECTS OF THE INVENTION

Accordingly, an object of the present invention is to provide a composition for use in cementitious products that results in the cementitious products being resistant to deterioration by aggressive fluids.

Another object of the invention is to provide a composition for use in cementitious products that is color-compatible with white or lightly-colored cementitious products.

Another object of the invention is to provide a composition for use in cementitious products that permits coloration of the product without the need for pigments, such as dry or liquid pigments.

Another object of the invention is to provide a pre-blended product which can be easily shipped and stored, and does not require extensive measuring and/or blending or mixing in the field;

A further object of the invention is to provide a composition for use in cementitious products that is not detrimental to the formation of the cementitious binders and other components, and which may facilitate such formation.

A still further object of the invention is to provide related methods.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a cementitious material is provided for use in such applications, for example, as patios, swimming pools, spas, and a host of other applications. The cementitious material has what is referred to herein as a "total mass." This refers to the total mass of the components of the composition or material, including all components except the water or similar working fluid. The cementitious material comprises a cement having a cement mass, and an aggregate having an aggregate mass. The cement mass and the aggregate mass has a combined mass of about 80 to 95 percent of the total mass. The cementitious material also includes a pozzolan composition comprising at least one of a silica fume and a metakaolin. The pozzolan composition is present in an amount of about 4.0 to 6.0 percent of the total mass. The cementitious material further includes an acrylic polymer composition.

Preferably the pozzolan composition is present in an amount of about 4.0 to 4.5 percent of the total mass. More preferably, the pozzolan composition is present in an amount of about 4.2 to 4.5 percent of the total mass. The pozzolan composition may comprise a white silica fume, a black silica fume, a gray silica fume, and/or a metakaolin.

The acrylic polymer composition preferably comprises an acrylic polymer and an anti-foaming agent. Preferably it is present in an amount of 1 to 4 percent of the total mass. More preferably, the acrylic polymer composition is present in an amount of about 1.5 to 2.5 percent of the total mass. In the presently preferred embodiments, and depending upon the specific application, the acrylic polymer composition is present in an amount of about 2.0 percent of the total mass. The acrylic polymer in the preferred embodiments is in a solid state.

The cementitious material as an option may include a colored particle component consisting essentially of at least one of quartz particles and ceramic particles.

As examples of preferred embodiments according to the invention, various mixtures of various pozzolans may be combined in formulating the cementitious material. For example, the pozzolan composition in one embodiment consists essentially of a metakaolin in an amount of about 2.5 percent of the total mass, and a white silica fume in an amount of about 2.0 percent of the total mass. In another embodiment, the pozzolan composition consists essentially of a white silica fume in an amount of about 4.5 mass percent of the total mass. In yet another embodiment, the pozzolan composition consists essentially of a gray silica fume in an amount of about 3.0 percent of the total mass, and a black silica fume in an amount of about 1.0 percent of the total mass. In still another embodiment, the pozzolan composition consists essentially of a gray silica fume in an amount of about 2.7 percent of the total mass, and a black silica fume in an amount of about 1.5 percent of the total mass. In another embodiment, the pozzolan composition consists essentially of a black silica fume in an amount of about 4.2 percent of the total mass.

In accordance with another aspect of the invention, a cementitious material is provided which comprises a cement having a cement mass, an aggregate having an aggregate mass, a pozzolan composition comprising at least one of a silica fume and a metakaolin, the pozzolan composition having a pozzolan mass which is about 10 to 20 percent of the combination of the cement mass and the pozzolan mass, and an acrylic polymer composition.

According to this aspect, the cement-mass and the aggregate mass preferably have a combined mass amount of about 80 to 95 percent of the total mass. The pozzolan mass preferably is about 12 to 15 percent of the combination of the cement mass and the pozzolan mass. The mass of the acrylic polymer composition preferably comprises about 2 to 10 percent of the combination of the cement mass and the pozzolan mass. In some embodiments, successful results may be achieved where the mass of the acrylic polymer composition comprises about 3 to 7 percent of the combination of the cement mass and the pozzolan mass. In a more selected set of embodiments, the mass of the acrylic polymer composition comprises about 5.0 to 5.5 percent of the combination of the cement mass and the pozzolan mass.

In accordance with another aspect of the invention, an admixture is provided for use with a cementitious material having a cement mass and a total mass. The admixture comprises a pozzolan composition comprising at least one of a silica fume and a metakaolin, and an acrylic polymer composition.

In such admixtures, the pozzolan composition preferably is present in an amount relative to the acrylic polymer composition of about 2 to 1 based upon mass. In some embodiments, the pozzolan composition consists of about 68 to 71 percent by mass of the combined masses of the pozzolan composition and the acrylic polymer composition.

The pozzolan composition may comprise, for example, a white silica fume, a black silica fume, a gray silica fume, and metakaolin. In an illustrative preferred embodiment, the pozzolan composition consists essentially of a metakaolin and a white silica fume present in about a 1 to 1 ratio by mass. In another embodiment, the pozzolan composition consists essentially of a gray silica fume and a black silica fume present in a ratio by mass of 3 parts gray silica fume to 1 part black silica fume. In still another embodiment, the pozzolan composition consists essentially of a gray silica fume and a black silica fume present in a ratio by mass of about 2 parts gray silica fume to 1 part black silica fume. In another embodiment, the gray silica fume constitutes about 65% of the combined mass of the gray silica fume and the black silica fume.

The acrylic polymer composition comprises an acrylic polymer and an anti-foaming agent.

In accordance with another aspect of the invention, a method is provided for making a cementitious material-having a total mass. The method comprises a first step of combining a cement having a cement mass with a pozzolan composition comprising at least one of a silica fume and a metakaolin and mixing to make a cement mixture. The pozzolan composition is present in an amount of about 4.0 to 6.0 percent of the total mass. The method includes a second step of adding an acrylic polymer composition to the cement mixture, and a third step of adding an aggregate having an aggregate mass to the cement mixture, so that the cement mass and the aggregate mass have a combined mass of about 80 to 95 percent of the total mass. Preferably but optionally, the first, second and third steps are performed sequentially.

Preferably, the first step includes adding the pozzolan composition in an amount of about 4.0 to 4.5 percent of the total mass. A more preferred range for the pozzolan composition is about 4.2 to 4.5 percent of the total mass. The pozzolan composition may comprise white silica fume, a black silica fume, a gray silica fume, and/or a metakaolin.

The acrylic polymer composition preferably comprises an acrylic polymer and an anti-foaming agent. The acrylic polymer composition preferably is in an amount of 1 to 4 percent of the total mass, and more preferably about 1.5 to 2.5 percent of the total mass. In some applications, the acrylic polymer composition may be present in an amount of about 2.0 percent of the total mass. The acrylic polymer preferably is included as a solid state material.

The method optionally may include a fourth step of adding a colored particle component consisting essentially of at least one of quartz particles and ceramic particles to the cement mixture.

As specific but merely illustrative examples of the method according to the invention, various pozzolan may be used alone or in combination. For example, the first step preferably includes adding the pozzolan composition in the form of a metakaolin in an amount of about 2.5 percent of the total mass and a white silica fume in an amount of about 2.0 percent of the total mass. As an alternative embodiment, the first step may include adding the pozzolan composition in the form of a white silica fume in an amount of about 4.5 mass percent of the total mass. In another version of the method, wherein the first step includes adding the pozzolan composition in the form of a gray silica fume in an amount of about 3.0 percent of the total mass and a black silica fume in an amount of about 1.0 percent of the total mass. In another version of the method, the first step includes adding the pozzolan composition in the form of a gray silica fume in an amount of about 2.7 percent of the total mass and a black silica fume in an amount of about 1.5 percent of the total mass. In still another version of the method, the first step includes adding the pozzolan composition in the form of a black silica fume in an amount of about 4.2 percent of the total mass.

In accordance with another aspect of the invention, a method is provided for making a cementitious material having a total mass. The method comprises a first step of combining a cement having a cement mass with a pozzolan composition comprising at least one of a silica fume and a metakaolin and mixing to make a cement mixture. The pozzolan composition has a pozzolan mass which is about 10 to 20 percent of the combination of the cement mass and the pozzolan mass. The method includes a second step of adding an acrylic polymer composition to the cement mixture; and a third step of adding an aggregate having an aggregate mass to the cement mixture. The first, second and third steps preferably are performed sequentially.

In this method, the cement mass and the aggregate mass preferably have a combined mass amount of about 80 to 95 percent of the total mass.

The first step preferably but optionally includes adding the pozzolan composition in an amount so that the pozzolan mass is about 12 to 15 percent of the combination of the cement mass and the pozzolan mass. The second step preferably but optionally includes adding the acrylic polymer composition so that the mass of the acrylic polymer composition is about 2 to 10 percent of the combination of the cement mass and the pozzolan mass, and more preferably about 3 to 7 percent of the combination of the cement mass and the pozzolan mass. In some applications, the second step includes adding the acrylic polymer composition so that the mass of the acrylic polymer composition is about 5.0 to 5.5 percent of the combination of the cement mass and the pozzolan mass.

DETAILED DESCRIPTION OF THE PREFERRED EMBODIMENTS AND METHODS

Reference will now be made in detail to the presently preferred embodiments and methods of the invention. It should be noted, however, that the invention in its broader aspects is not limited to the specific details, representative devices and methods, and illustrative examples described in this section in connection with the preferred embodiments and methods. The invention according to its various aspects is particularly pointed out and distinctly claimed in the attached claims read in view of this specification, and appropriate equivalents.

In accordance with one aspect of the invention, a cementitious material is provided. The cementitious material according to the invention preferably is in the form of a solid particle mixture. The mixture has a total mass which will depend upon the application. The term "total mass" is used herein refers to the total or combined mass of all components (other than water) in the cementitious material as it would be used in the field. This term includes, for example, cement, supplemental cementitious materials ("SCM") such as pozzolans, aggregates, polymers, etc. SCM refers primarily to pozzolans, but also may include blast furnace slag. The total mass is used herein as a mass reference or standard for determining proportions or relative amounts of ingredients or components of the total mixture, i.e. after all of the solid components have been added to the mixture, but before water is added.

The cementitious material according to one aspect of the invention comprises a cement having a cement mass. "Cement" as the term is used here is used in its common and broad sense to include Type I white Portland cement. Type III white Portland cement also is suitable. Preferred cements for use in accordance with the invention include Riverside white cement, Lehigh-Waco, Lehigh-Monterey, Federal-Cruz Azual, and Federal-Canadian. The term "cement mass" as used herein refers to the mass of the actual cement component. The cement preferably is present in an amount of about 30 to 35 percent of the total mass.

Further according to this aspect of the invention, the cementitious composition includes an aggregate having an aggregate mass. The term "aggregate" as used herein is used in the common and broad sense to include such materials as calcite aggregates such as marble and limestone, and silicious (silicon containing) materials such as silica sand, quartz and crushed feldspar. Aggregates also may consist of synthetic type aggregate products such as 3M™ COLORQUARTZ™ synthetic aggregate, commercially available from Minnesota Mining and Mfg., 3M Construction Markets Division, of St. Paul, Minn., and Conversion Technologies, Inc.'s Ceramaglass and Ceramaquartz. Preferred aggregates for use in accordance with the invention include marble and limestone.

The "aggregate mass" refers to the dry mass of the aggregate component alone. Preferably the aggregate is present in an amount of about 50 to 65 mass percent of the total mass. It is also preferred that the cement mass and the aggregate mass have a combined mass of about 80 to 95 percent of the total mass.

The cementitious material according to this aspect of the invention also includes a pozzolan composition comprising at least one of a silica fume and a metakaolin. A "pozzolan" as used here refers to a supplementary cementitious material (SCM), such as silica fume, metakoalin, and other natural materials such as Type N pozzolans from natural or volcanic sources. A pozzolanic material is a mineral admixture for use with cement having cementitious-like properties. Many pozzolans typically are made up of small, amorphous spherical particles. They usually, and preferably, are smaller than the cement grains in which they will be used. An average cement grain, for example, might have a diameter of about 7 microns, whereas the pozzolans metakaolin and silica fume typically have an average particle size of about 1.5 microns and 0.1 to 0.5 microns, respectively. Pozzolans may be natural or synthetic. It is optional but preferred that the metakaolin particle sizes for the bulk of the metakaolin be no more than about 5 microns, and the particle or agglomeration size for the silica fume particles is no more than about 1.0 micron. Examples of artificial synthetic pozzolans include silica fume and fly ash. Examples-of naturally-occurring pozzolans would include metakaolin, volcanic tuff, and diatomaceous earth. A "pozzolan composition" as used herein is a composition which includes one or more pozzolans. The pozzolan compositions according to the invention preferably consist of, or consist essentially of, one or more pozzolans, so that any portion of the pozzolan composition which is not a pozzolan is present only in small quantities if at all. Pozzolans useful as components in materials according to the invention include white silica fume, black silica fume, gray silica fume, and metakaolin.

The pozzolan composition preferably is present in an amount of about 4.0 to 4.5 mass percent of the total mass of the cementitious material. More preferably, the pozzolan composition is present in an amount of about 4.2 to 4.5 percent of the total mass. According to another aspect of the invention, the pozzolan composition has a "pozzolan mass" (the mass of the pozzolan composition) which is about 10 to 20 percent of the combination of the cement mass and the pozzolan mass. In some applications, the preferred range for the pozzolan composition is about 12 to 15 percent of the combination of the cement mass and the pozzolan mass.

The cementitious material according to this aspect of the invention preferably includes an acrylic polymer composition, which preferably comprises an acrylic polymer, preferably a dry acrylic polymer, and an antifoaming agent, also preferably dry (solid, such as a powder). The acrylic polymer serves as a dispersing agent and as a film former. Preferred dry acrylic polymers for use in accordance with the invention include Air Products HP-15, Air Products SP-102, and Rohm & Haas DP-2903. Liquid acrylic polymers also may be used. Examples of suitable liquid acrylic polymers include Rohm & Haas MC-76, Rohm & Haas 1834, and Air Products CP-67.

The anti-foaming agent functions to facilitate the removal of gas bubbles or pockets in the polymer. Preferred anti-foaming agents for use in accordance with the invention include Rhone-Polenc DD-775 and Dow Corning 1920.

The acrylic polymer composition preferably comprises about 1 to 4 percent of the total mass. More preferably the range is about 1.5 to 2.5, and still more preferably the acrylic polymer composition is about 2.0 percent of the total mass. An acrylic polymer composition of about 1.9 percent, which consists of or consists essentially of 1.8 percent acrylic polymer and 0.1 percent anti-foaming agent relative to the total mass, is presently preferred. In some applications, the mass of the acrylic polymer composition comprises about 2 to 10 percent of the combination of the cement mass and the pozzolan mass. A more preferable range in certain applications is about 3 to 7 percent of the combination of the cement mass and the pozzolan mass, and an even more preferred range is about 5.0 to 5.5 percent of the combination of the cement mass and the pozzolan mass.

Coloration of the cementitious product formed by cementitious materials according to the invention may be achieved in any one or combination of ways. The invention is advantageous in its ability to achieve such coloration without the use of pigments. Pigments have been disadvantageous in cementitious product applications for a number of reasons. As summarized above, they are difficult to properly disperse, they often result in non-uniform or otherwise defective textures, and they are vulnerable to ultraviolet fading, degradation, etc.

In accordance with various aspects of the invention, the cementitious product may be colored by the use and combination of pozzolans which themselves bear the desired colors. Examples include the use of gray or black silica fume to obtain darkened colors for products. The shades of the product can be adjusted by regulating the relative quantities of variously colored pozzolans.

Another means to achieve coloration in the cementitious product without the use of pigments involves the use of one or more colored particle components, for example, which may consist of or consist essentially of at least one of colored (non-white) quartz particles and/or colored (non-white) ceramic particles. Preferably, the quartz particles are synthetic quartz particles, for example, such as 3M COLORQUARTZ™ synthetic aggregate product, commercially available from Minnesota Mining & Mfg., 3M Construction Markets Division, of St. Paul, Minn.

In accordance with another aspect of the invention, an admixture is provided for use with a cementitious material. Admixtures according to the invention include a pozzolan composition comprising at least one of a silica fume and a metakaolin, and an acrylic polymer composition. The pozzolan composition preferably is present in an amount relative to the acrylic polymer composition of about 2 to 1 based upon mass. In some applications, the pozzolan composition consists of about 68 to 71 percent by mass of the combined masses of the pozzolan composition and the acrylic polymer composition. The pozzolan composition may comprise a white silica fume, a black silica fume, a gray silica fume, and/or a metakaolin.

In each such case, the admixture may be made by combining the pozzolan, any colorants, and the acrylic polymer composition into a solid particle mixture or blend. The admixture then may be used, for example, in the field, by mixing and blending it to a cement and an aggregate as described above, and in the various proportions discussed above and herein, to obtain a cementitious material also as described herein.

In accordance with another aspect of the invention, a method is provided for making a cementitious material having a total mass. The method comprises combining, mixing and/or blending ingredients as follows.

The method includes a first step of combining a cement having a cement mass with a pozzolan composition comprising at least one of a silica fume and a metakaolin and mixing to make a cement mixture. The pozzolan may include, for example, a white silica fume, a black silica fume, a gray silica fume, and/or a metakaolin. Each of these materials may be used as the sole pozzolan, or in virtually any combination, provided the amounts are generally within the desired mass ranges as described herein. The pozzolan composition preferably is added so that it is present in an amount of about 4.0 to 6.0 percent of the total mass. In some applications of the preferred method, the first step includes adding the pozzolan composition in an amount of about 4.2 to 4.5 percent of the total mass.

The method also includes a second step of adding an acrylic polymer composition to the cement mixture. As generally described above, the acrylic polymer composition preferably includes an acrylic polymer, preferably dry, with an anti-foaming agent, also preferably dry. Examples of such acrylic polymers and anti-foaming agents are provided above.

The method includes a third step of adding an aggregate having an aggregate mass to the cement mixture, so that the cement mass and the aggregate mass have a combined mass of about 80 to 95 percent of the total mass.

Preferably but optionally, the first, second and third steps are performed sequentially. This is not, however, an absolute requirement. In some applications, for example, the steps may be performed in the opposite order, or in some mixed fashion.

As an option, the method may include a fourth step of adding a colored particle component consisting of or consisting essentially of at least one of quartz particles and ceramic particles to the cement mixture. The colored particle component may include any of the illustrative colored particles described above.

To illustrate the types of compositions within the scope of the invention, a number of examples will now be provided in which presently preferred embodiments or compositions and methods of making them will be provided. In each of these examples, the compositions include a cement, an aggregate, at least one pozzolan, and a polymer composition.

The cement portion of the composition in these preferred embodiments of the invention consists of a white Portland cement, which more specifically is Cruz Azul, commercially available from Federal Cement of Canada. The aggregate in each of these compositions consists of a marble sand, which in these examples was a Georgia Marble Pool Mix. In those examples wherein white silica fume is used, it consists of white silica fume from Learco Industrial Ceramics of Orchard Park, N.Y. Where gray silica fume is called for, the gray silica fume used here was 900W gray silica fume, commercially available from Elkem Materials of Pittsburgh, Pa. The black silica fume used in these examples was from Elkem Materials of Pittsburgh, Pa., commercially available from Elkem. Where metakaolin was used in the illustrative examples below, the specific metakaolin used was Metamax from Engelhard Corporation of New Jersey. The acrylic polymer used in these examples was HP-15 dry acrylic polymer, commercially available from Air Products of Allentown, Pa. An alternative, and in some applications preferred, acrylic polymer for these example is SP-102 dry acrylic polymer, also commercially available from Air Products.

EXAMPLE 1

This illustrative example provides a cementitious composition in which the pozzolan consists essentially of a metakaolin and a white silica fume in combination. The metakaolin preferably is present in an amount of about 2.0 to 3.0 mass percent of the total mass, and the white silica fume preferably is present in an amount of about 1.5 mass percent of the total mass. More specifically, a cementitious composition was prepared according to a preferred method of the invention by adding and mixing the following components:

| | | |
|---|---|---|
| 60.9% | 1225 lb. | marble sand |
| 32.7% | 658 lb. | cement (white) |
| 2.5% | 50 lb. | metakaolin |
| 2.0% | 40 lb. | white silica fume |
| 1.8% | 36 lb. | acrylic polymer |
| 0.1% | 1–2 lb. | antifoaming agent |
| 100.0% | 2010–2011 lb. | total |

As can be seen in this example, the pozzolan consists essentially of a metakaolin in an amount of about 3.0 mass percent of the total mass, and a white silica fume in an amount of about 1.5 mass percent of the total mass.

EXAMPLE 2

In this illustrative example, the pozzolan consists essentially of a white silica fume in an amount of about 4.5 percent of the total mass. More specifically, a cementitious composition was prepared according to a preferred method of the invention by adding and mixing the following components:

| | | |
|---|---|---|
| 60.9% | 1225 lb. | marble sand |
| 32.7% | 658 lb. | cement (white) |
| 4.5% | 90 lb. | white silica fume |
| 1.8% | 36 lb. | acrylic polymer |
| 0.1% | 1–2 lb. | anti-foaming agent |
| 100.0% | 2010–2011 lb. | total |

In this example, the pozzolan consists essentially of a white silica fume in an amount of about 4.5 mass percent of the total mass.

EXAMPLE 3

In this example, the cementitious material produces a product which has a blue speckled appearance, while providing the advantageous properties noted above. In this material, the pozzolan consists essentially of a metakaolin in an amount of about 2.2 mass percent of the total mass, and a white silica fume in an amount of about 2.0 mass percent of the total mass. The cementitious material includes colored particles, which in this specific example comprise non-white quartz crystals. The colored particles preferably are in an amount of about 6.0 mass percent of the total mass. In this example, the cementitious composition was prepared according to a preferred method of the invention by adding and mixing the following components:

| | | |
|---|---|---|
| 54.7% | 1100 lb. | marble sand |
| 6.2% | 125 lb. | blue colored synthetic quartz or ceramic particles |
| 32.7% | 658 lb. | cement (white) |
| 2.5% | 50 lb. | metakaolin |
| 2.0% | 40 lb. | white silica fume |
| 1.8% | 36 lb. | acrylic polymer |
| 0.1% | 1–2 lb. | antifoaming agent |
| 100.0% | 2010–2011 lb. | total |

The pozzolan in this example consists essentially of a metakaolin in an amount of about 5.0 mass percent of the total mass, and a white silica fume in an amount of about 2.0 mass percent of the total mass.

EXAMPLE 4

In this example, a cementitious material is provided which results in a gray product. In it, the pozzolan consists essentially of a gray silica fume in an amount of about 3.0 mass percent of the total mass, and a black silica fume in an amount of about 1.0 mass percent of the total mass. A cementitious composition was prepared according to a preferred method of the invention by adding and mixing the following components:

| | | |
|---|---|---|
| 61.3% | 1225 lb. | marble sand |
| 32.9% | 658 lb. | white cement |
| 3.0% | 60 lb. | gray silica fume |
| 1.0% | 20 lb. | black silica fume |
| 1.8% | 36 lb. | acrylic polymer |
| 0.1% | 1–2 lb. | anti-foaming agent |
| 100.0% | 2000–2001 lb. | total |

The pozzolan in this example consists essentially of a gray silica fume in an amount of about 3.0 mass percent of the total mass, and a black silica fume in an amount of about 1.0 mass percent of the total mass.

EXAMPLE 5

In this example, as in Example 4, a cementitious material is provided which yields a gray-colored product. According to this example, the pozzolan consists essentially of a gray silica fume in an amount of about 2.7 mass percent of the total mass, and a black silica fume in an amount of about 1.5 mass percent of the total mass. The cementitious composition was prepared according to a preferred method of the invention by adding and mixing the following components:

| | | |
|---|---|---|
| 54.9% | 1100 lb. | marble sand |
| 6.2% | 125 lb. | blue colored quartz or ceramic particles |
| 32.8% | 658 lb. | cement (white) |
| 2.7% | 55 lb. | gray (light) silica fume |
| 1.5% | 30 lb. | black silica fume |

| | | |
|---|---|---|
| 1.8% | 36 lb. | acrylic polymer |
| 0.1% | 1–2 lb. | anti-foaming agent |
| 100.0% | 2005–2006 lb. | total |

The pozzolan here consists essentially of a gray silica fume in an amount of about 2.7 mass percent of the total mass, and a black silica fume in an amount of about 1.5 mass percent of the total mass.

EXAMPLE 6

In this example, a cementitious material is provided which yields a black product. In the material, the pozzolan consists essentially of a black silica fume in an amount of about 4.2 mass percent of the total mass. Specifically, a cementitious composition was prepared according to a preferred method of the invention by adding and mixing the following components:

| | | |
|---|---|---|
| 61.1% | 1225 lb. | marble sand |
| 32.8% | 658 lb. | cement (white) |
| 4.2% | 85 lb. | black silica fume |
| 1.8% | 36 lb. | acrylic polymer |
| 0.1% | 1–2 lb. | anti-foaming agent |
| 100.0% | 2005–2006 lb. | total |

EXAMPLE 7

A cementitious composition was prepared according to a preferred method of the invention by adding and mixing the following components:

| | | |
|---|---|---|
| 54.9% | 1100 lb. | marble sand |
| 6.2% | 125 lb. | black colored quartz or ceramic particles |
| 32.8% | 658 lb. | cement (white) |
| 4.2% | 85 lb. | black silica fume |
| 1.8% | 36 lb. | acrylic polymer |
| 0.1% | 1–2 lb. | anti-foaming agent |
| 100.0% | 2005–2006 lb. | total |

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A method for treating a swimming pool surface area, the method comprising:
preparing a slurry including water and solid ingredients, the solid ingredients having a total mass comprising
a cement having a cementious mass;
an aggregate having an aggregate mass, the cement mass and aggregate mass having a combined mass ranging from 80 to 95 percent of the total mass;
a pozzolan composition comprising a silica fume and a metakaolin, the pozzolan composition being present in an amount of about 4.0 to 6.0 percent of the total mass; and
an acrylic polymer composition; and
applying the slurry to the swimming pool surface.

2. A method as recited in claim 1, wherein the pozzolan composition is present in an amount of about 4.0 to 4.5 percent of the total mass.

3. A method as recited in claim 1, wherein the pozzolan composition is present in an amount of about 4.2 to 4.5 percent of the total mass.

4. A method as recited in claim 1, wherein the pozzolan composition comprises a silica fume.

5. A method as recited in claim 1, wherein the acrylic polymer composition comprises an acrylic polymer and an anti-foaming agent.

6. A method as recited in claim 1, further including a colored particle component consisting essentially of particles selected from the group consisting of quartz particles, ceramic particles and combinations thereof.

7. A method for treating a swimming pool surface area, the method comprising:
preparing a slurry including water and solid ingredients, the solid ingredients having a total mass comprising
a cement having a cementious mass;
an aggregate having an aggregate mass, the cement mass and aggregate mass having a combined mass ranging from 80 to 95 percent of the total mass;
a pozzolan composition selected from the group consisting of a silica fume, a metakaolin and combinations thereof, the pozzolan composition being present in an amount of about 4.0 to 6.0 percent of the total mass; and
an acrylic polymer composition, wherein the acrylic polymer composition is present in an amount of 1 to 4 percent of the total mass; and
applying the slurry to the swimming pool surface.

8. A method as recited in claim 7, wherein the acrylic polymer composition is present in an amount of 1.5 to 2.5 percent of the total mass.

9. A method as recited in claim 7, wherein the pozzolan composition comprises a metakaolin.

10. A method as recited in claim 7, further including a colored particle component consisting essentially of particles selected from the group consisting of quartz particles, ceramic particles and combinations thereof.

11. A method as recited in claim 8, wherein the pozzolan composition comprises a silica fume.

12. A method as recited in claim 8, wherein the pozzolan composition comprises a metakaolin.

13. A method as recited in claim 8, further including a colored particle component consisting essentially of particles selected from the group consisting of quartz particles, ceramic particles and combinations thereof.

14. A method for treating a swimming pool surface area, the method comprising:
preparing a slurry including water and solid ingredients, the solid ingredients having a total mass comprising
a cement having a cementious mass;
an aggregate having an aggregate mass;
a pozzolan composition selected from the group consisting of a silica fume, a metakaolin and combinations thereof, the pozzolan composition having a pozzolan mass which is about 10 to 20 percent of the combination of the cement mass and the pozzolan mass; and an acrylic polymer composition, wherein the mass of the acrylic polymer composition comprises about 2 to 10 percent of the combination of the cement mass and the pozzolan mass; and applying the slurry to the swimming pool surface.

15. A method as recited in claim 14, wherein the mass of the acrylic polymer composition comprises about 3 to 7 percent of the combination of the cement mass and the pozzolan mass.

16. A method as recited in claim 14, wherein the mass of the acrylic polymer composition comprises about 5.0 to 5.5 percent of the combination of the cement mass and the pozzolan mass.

17. A method as recited in claim 14, wherein the pozzolan composition comprises a silica fume.

18. A method as recited in claim 14, wherein the pozzolan composition comprises a metakaolin.

19. A method as recited in claim 14, further including a colored particle component consisting essentially of particles selected from the group consisting of quartz particles, ceramic particles and combinations thereof.

20. A method for treating a swimming pool surface area, the method comprising:

preparing a slurry including water and solid ingredients, the solid ingredients having a total mass comprising:

a cement having a cementious mass ranging from 30 to 35 percent of the total mass;

an aggregate having an aggregate mass ranging from 50 to 65 percent of the total mass, the aggregate mass and the cement mass having a combined mass ranging from 80 to 95 percent of the total mass;

a pozzolan composition selected from the group consisting of a silica fume, a metakaolin and combinations thereof, the pozzolan composition having a pozzolan mass ranging from 4 to 6 percent of the total mass; and an acrylic polymer having a polymer mass ranging from 1 to 4 percent of the total mass; and applying the slurry to the swimming pool surface.

21. A method as recited in claim 20, wherein the pozzolan composition comprises a silica fume.

22. A method as recited in claim 20, wherein the pozzolan composition comprises a metakaolin.

23. A method as recited in claim 20, further including a colored particle component consisting essentially of particles selected from the group consisting of quartz particles, ceramic particles and combinations thereof.

24. A method as recited in claim 20, wherein the acrylic polymer composition is present in an amount of 1.5 to 2.5 percent of the total mass.

* * * * *

UNITED STATES PATENT AND TRADEMARK OFFICE
CERTIFICATE OF CORRECTION

PATENT NO. : 6,653,373 B2  Page 1 of 1
DATED : November 25, 2003
INVENTOR(S) : Gregory Garrett and Vito Mariano It is certified that error appears in the above-identified patent and that said Letters Patent is hereby corrected as shown below:

Column 14,
Line 13, reference number "1" should read -- 7 --.

Signed and Sealed this

Twenty-seventh Day of April, 2004

JON W. DUDAS
*Acting Director of the United States Patent and Trademark Office*